Sept. 27, 1960 A. M. VIK 2,953,890
GUARD TONGUE AND LEDGER PLATE
Filed Jan. 10, 1958
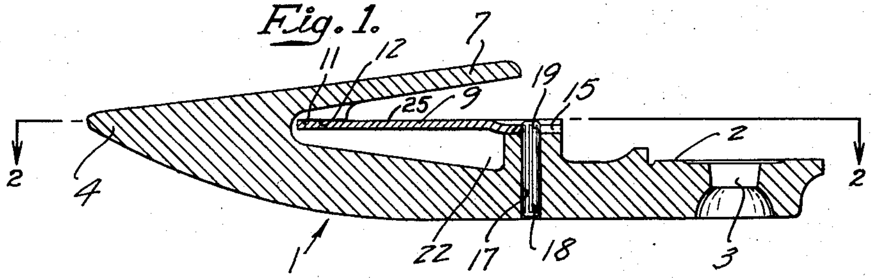
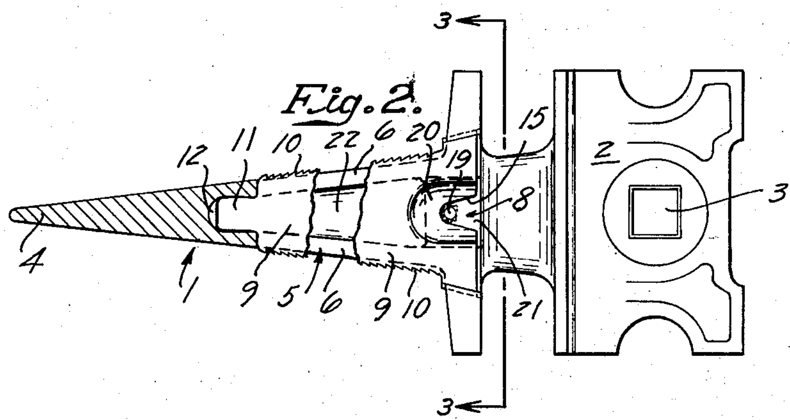
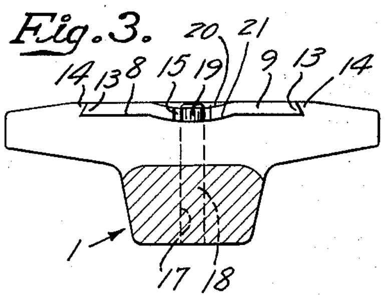
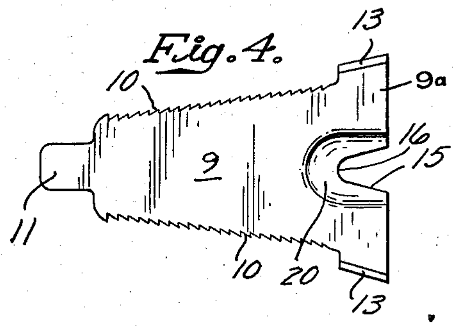
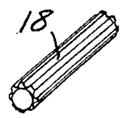
INVENTOR.
Albam M. Vik
BY
Merchant & Merchant
ATTORNEYS United States Patent Office 2,953,890

Patented Sept. 27, 1960

2,953,890

GUARD TONGUE AND LEDGER PLATE

Albam M. Vik, New Brighton, Minn., assignor, by direct and mesne assignments, to Viking Corporation, a corporation of Minnesota Filed Jan. 10, 1958, Ser. No. 708,310

3 Claims. (Cl. 56—311)

My invention relates to sickle mowers and more particularly to improvements in mower guards and ledger plates therefor.

The primary object of my invention is the provision of a device of the class above described wherein means is provided for quickly and with a minimum of skill, replacing of the worn ledger plates on their respective mower guards.

A further object of my invention is the provision of a device of the class above described wherein the ledger plates are held positively in operative position against accidental displacement.

A still further object of my invention is the provision of a device of the class above described which is extremely inexpensive to produce, which incorporates a minimum of working parts and which is rugged and durable.

The above and still further objects of my invention will become apparent from the following detailed specification, appended claims and attached drawings.

Referring to the drawings wherein like characters indicate like parts throughout the several views:

Fig. 1 is a view in axial section of a mower guard, illustrating my invention;

Fig. 2 is a view partly in top plan and partly in section taken on the line 2—2 of Fig. 1;

Fig. 3 is an enlarged transverse section taken on the line 3—3 of Fig. 2;

Fig. 4 is a view in top plan of the ledger plate of my invention; and

Fig. 5 is a view in perspective of the locking pin of my invention.

Referring with greater particularity to the drawings, the numeral 1 indicates in its entirety a mower guard having at its rear portion a flattened area 2 for the detachable reception of a sickle bar, not shown, through the medium of nut-equipped headed bolts, not shown, extending through a vertical opening 3 and alignable openings in the sickle bar. At its intermediate portion rearwardly of its pointed forward end 4, the mower guard 1 is formed to provide a seat identified in its entirety by the numeral 5 and including forwardly converging side edge portions 6 which underlie and are vertically spaced from a rearwardly projecting guard tongue 7. The seat 5 also includes a rear end portion 8 which connects the side portions 6 and is located rearwardly of a vertical plane defined by the rear end of said tongue 7.

The ledger plate 9 is of substantially the same general configuration as the seat 5, having serrated side edge portions 10 which project laterally outwardly from the respective side edge portions 6, when a pointed tip 11 is received within a recess 12 in the mower guard forwardly of the side portions 6, see particularly Fig. 2.

At its rear end, the ledger plate 9 and the adjacent portion of the seat 5 laterally outwardly of the side edge portions 6 thereof have cooperating forwardly tapering dovetail connections, identified by the numerals 13 and 14 respectively, whereby the rear end portion of the ledger plate 9 is held against transverse and upward movements with respect to the seat 5. The rear end portion **9*a* of the ledger plate 9 defines a rearwardly opening notch 15, the forward end portion 16 of which is in register with a vertically disposed aperture 17 extending through the mower guard 1 transversely intermediate the side edge portions 6 of the seat 5 and longitudinally intermediate the rear end portion 8 of the seat 5 and the vertical plane defined by the rear end of said tongue 7. By this novel arrangement of parts, it is possible for the operator to positively lock the ledger plate 9 upon the seat 5 with the pointed end 11 thereof in the recess 12, by inserting a suitable locking pin 18 in the aperture 17 with the upper end 19 of the pin 18 in tight frictional engagement with the forward end 16 of the notch 15**.

The notch 15 not only makes it possible for the operator to view the aperture 17 in the guard 1, so as to facilitate registration therebetween and the forward end 16 of said notch 15—for purposes of insertion of the locking pin 18 therein—, but also permits contracting of the rear end portion of the ledger plate 9 on opposite sides of the notch 15 when necessary due to slight differentials in the maximum widths of the ledger plates 9 at their rear ends, as the forwardly tapering dove-tail connections 13 and 14 are caused to engage each other.

When the ledger plate 9 becomes worn, it is but necessary, in order that same may be replaced, of the operator to drive the upper end 19 of the pin 18 downwardly sufficiently to cause disengagement thereof with the forward end 16 of the notch 15. After replacement of the worn ledger plate 9 with a new one, the old locking pin 18 may be completely replaced by a new one superimposed thereover while impact is brought to bear upon the upper end 19 of the latter. Preferably and as shown, the ledger plate 9 is downwardly dished as at 20, radially outwardly of the notch 15, said dished portion 20 being received in part in a recess 21 in the rear end portion 8 of the seat 5 as well as in the concavity 22 in the intermediate portion of the mower guard 1 encompassed by the seat 5. With this arrangement of parts, the extreme upper end 19 of the locking pin 18 may extend slightly above the dished portion 20, as shown, without projecting above the plane defined by the upper surface 25 of the ledger plate 9—therefore, largely eliminating any possibility of engagement of the locking pin 18 by the reciprocating cutter blades, not shown, but which are normally secured to and carried by the sickle bar.

My invention has been thoroughly tested and found to be completely satisfactory for the accomplishment of the above objects and while I have shown a preferred embodiment thereof, I wish it to be understood that same is capable of modification without departure from the scope and spirit of the appended claims.

What I claim is:

1. A mower guard and ledger plate therefor, said mower guard defining a seat having forwardly converging side edge portions which underlie and are vertically spaced from a rearwardly projecting guard tongue and a rear end portion rearwardly of a vertical plane defined by the rear end of said tongue, a ledger plate supported on said seat, said ledger plate having a tip of reduced width at its forward end receivable in a recess in the mower guard forwardly of said side edge portions, the rear end portion of said ledger plate and the adjacent portion of said seat laterally outwardly of said side edge portions having a forwardly tapering dove-tail connection extending angularly relative to the longitudinal center of said ledger plate whereby the rear end portion of said ledger plate is held against transverse and upward movements with respect to said seat, the rear end portion of said ledger plate defining a rearwardly open notch, said guard having a vertically disposed aperture intermediate said vertical plane and the rear end of said seat in register with the forward end of said notch, and a locking pin removably mounted in said aperture and engaging the forward end of said notch to positively limit rearward movements of said ledger plate relative to said guard.

2. A mower guard and ledger plate therefor, said mower guard defining a seat having forwardly converging side edge portions which underlie and are vertically spaced from a rearwardly projecting guard tongue and having a forward end portion, a rear end portion and having a recess with forwardly converging side walls formed in its forward end portion, a ledger plate supported on said seat, said ledger plate having a tip of reduced width with side edges extending parallel to the longitudinal center of said plate at its forward end received in compressed relation in said recess in the mower guard forwardly of said side edge portions, the rear end portion of said ledger plate and the adjacent portions of said seat having a forwardly tapering dove-tail connection extending angularly relative to the longitudinal center of said ledger plate whereby the rear end portion of said ledger plate is held against transverse and upward movements with respect to said seat, the rear end portion of said ledger plate defining a rearwardly open notch, said guard having a vertically disposed aperture adjacent the rear end of said seat in register with the forward end of said notch, and a locking pin removably mounted in said aperture and engaging the forward end of said notch to positively prevent rearward movements of said ledger plate relative to said guard.

3. A mower guard and ledger plate therefor, said mower guard defining a seat having forwardly converging side edge portions which underlie and are vertically spaced from a rearwardly projecting guard tongue and having a rear end portion, a ledger plate supported on said seat, said ledger plate having a tip of reduced width at its forward end receivable in a recess in the mower guard forward of said side edge portions, the rear end portions of said ledger plate and the adjacent portion of said seat having a forwardly tapering dove-tail connection extending angularly relative to the longitudinal center of said ledger plate whereby the rear end portion of said ledger plate may be wedged forwardly relative to said guard to hold the rear end portion of said ledger plate against transverse and upward movements with respect to said seat, the rear end portion of said ledger plate defining a rearwardly open notch, and having an upper surface downwardly recessed radially around said notch, said guard having a vertically disposed aperture in register with the forward end of said notch, and a locking pin removably mounted in said aperture and engaging the forward end of said notch to positively prevent rearward movements of said ledger plate relative to said guard, said locking pin having an upper end disposed below said upper surface of said rear end portion of said ledger plate.

References Cited in the file of this patent

UNITED STATES PATENTS

| | | |
|---|---|---|
| 31,440 | Copeland | Feb. 19, 1861 |
| 841,398 | Rogers | Jan. 22, 1907 |
| 2,669,831 | Vik | Feb. 23, 1954 |